United States Patent [19]
Tajima et al.

[11] Patent Number: 5,995,276
[45] Date of Patent: Nov. 30, 1999

[54] WAVELENGTH-DIVISION-MULTIPLEXING OPTICAL AMPLIFIER DEVICE AND WAVELENGTH-DIVISION-MULTIPLEXING OPTICAL TRANSMISSION SYSTEM

[75] Inventors: Tsutomu Tajima; Tadayuki Chikuma, both of Tokyo, Japan

[73] Assignee: NEC Corporation, Japan

[21] Appl. No.: 08/887,597

[22] Filed: Jul. 3, 1997

[30]  Foreign Application Priority Data

Jul. 4, 1996  [JP]  Japan ..................................... 8-174600

[51] Int. Cl.[6] ............................ H04B 10/12; H04J 14/02; H01S 3/16
[52] U.S. Cl. .......................... 359/341; 359/124; 359/160; 359/337
[58] Field of Search ..................... 359/124, 160, 359/177, 337, 341, 566

[56]  References Cited

U.S. PATENT DOCUMENTS

| | | | |
|---|---|---|---|
| 5,268,786 | 12/1993 | Matsushita et al. | 359/341 |
| 5,392,154 | 2/1995 | Chang et al. | 359/349 |
| 5,455,704 | 10/1995 | Mizuochi et al. | 359/179 |
| 5,463,487 | 10/1995 | Epworth | 359/124 |
| 5,510,926 | 4/1996 | Bogart et al. | 359/179 |
| 5,600,473 | 2/1997 | Huber | 359/174 |
| 5,680,247 | 10/1997 | Okuno | 359/341 |
| 5,764,404 | 6/1998 | Yamane et al. | 359/341 |

FOREIGN PATENT DOCUMENTS

| | | |
|---|---|---|
| 9214428 | 8/1997 | Japan . |
| 9321701 | 12/1997 | Japan . |
| 2280561 | 2/1995 | United Kingdom . |
| 2294170 | 4/1996 | United Kingdom . |

OTHER PUBLICATIONS

Nakabayashi et al, Technical Report of IEIC, OCS94–66, OPE 94–89, pp. 1994–11.

*Primary Examiner*—Nelson Moskowitz
*Attorney, Agent, or Firm*—Ostrolenk, Faber, Gerb & Soffen, LLP

[57]  ABSTRACT

Optical signals transmitted from optical transmission panels are received by photodetectors, which detect the number of actually transmitted optical signals. A control signal depending on the number of optical signals detected is supplied to an optical amplifier. The intensity of a combined optical signal amplified by the control signal is controlled by controlling a current supplied to a pumping light source. Information representative of the number of optical signals detected is superposed onto the amplified optical signal by generating the current supplied to the pumping light source as a sine-wave signal depending on the detected number of optical signals. In a downstream optical repeater, the information representative of the number of optical signals is extracted, and the optical signal is amplified, after which the information representative of the number of optical signals is superposed again onto the amplified optical signal for transmission. Even when some of the optical transmission panels fail to operate and the optical signals transmitted therefrom are interrupted, since the combined optical signal is amplified depending on the number of optical signals detected, the optical signals are maintained at a constant gain and output level.

24 Claims, 2 Drawing Sheets

FIG. 1

WAVELENGTH-DIVISION-MULTIPLEXING OPTICAL AMPLIFIER DEVICE AND WAVELENGTH-DIVISION-MULTIPLEXING OPTICAL TRANSMISSION SYSTEM

BACKGROUND OF THE INVENTION

1. Field of the Invention

The present invention relates to a wavelength-division-multiplexing optical amplifier device for amplifying a plurality of optical signals having different wavelengths, and more particularly to the stabilization of an amplified optical output signal from such a wavelength-division-multiplexing amplifier device. The present invention is also concerned with a wavelength-division-multiplexing optical transmission system which employs wavelength-division-multiplexing optical amplifier device in an optical transmitter and an optical repeater.

2. Description of the Related Art

Conventional optical linear amplifier devices are controlled by an optical amplifier control process which branches an inputted optical signal of the optical linear amplifier, detects the reception level of the optical signal with a reception level monitor, and controls the amplification factor of the optical linear amplifier depending on the detected reception level. However, no reliable control system has been established yet for an optical transmission system where a plurality of different optical signals are wavelength-division-multiplexed for transmission, particularly an optical linear amplifier that employs optical pumping for its operation.

Wavelength-division-multiplexing optical transmission systems to which conventional optical linear amplifiers are directly applied suffer various problems. In such a wavelength-division-multiplexing optical transmission system, two or more optical signals having different wavelengths are wavelength-division-multiplexed in a single wavelength band, and amplified by an optical amplifier for transmission. One of the problems is that when one or more optical signals are interrupted for some reason, such a signal interruption is erroneously detected as a reduction in the inputted level of the combined optical signal, and the system increases the amplification factor of the optical amplifier, resulting in an increase in the amplification factor for each of the optical signals. This phenomenon happens because the conventional optical amplifier control process branches an inputted optical signal, detects the reception level of the optical signal with a reception level monitor, and controls the amplification factor of the optical amplifier depending on the detected reception level.

Another problem is that while the amplification factor for each of the optical signals may be set to a desired level at an upstream optical signal terminal of the wavelength-division-multiplexing optical transmission system, the amplification factor for each of the optical signals tends to vary depending on the number of optical signals at a downstream linear repeater. This is because there has been no means whatsoever for transmitting information representative of the number of optical signals from the upstream optical signal terminals to the downstream linear repeater.

SUMMARY OF THE INVENTION

It is an object of the present invention to provide a wavelength-division-multiplexing optical amplifier device for use in a wavelength-division-multiplexing optical transmission system in which two or more optical signals having different wavelengths are wavelength-division-multiplexed in a single wavelength band, and amplified by an optical amplifier for transmission, the wavelength-division-multiplexing optical amplifier device being capable of keeping at a constant level the output power of each of the optical signals even when one or more of the optical signals are interrupted for some reason, and of transmitting information representative of the number of optical signals to a downstream linear repeater or regenerative repeater.

Another object of the present invention is to provide an optical in-line amplifier (optical repeater amplifier device) for use as each of linear repeaters connected in multiple stages, which is capable of keeping at a constant level the output power of each of the normal optical signals received from optical booster amplifiers regardless of the number of optical signals even when one or more of the optical signals are interrupted for some reason, and of transmitting information representative of the number of optical signals to a downstream linear repeater or regenerative repeater.

Still another object of the present invention is to provide an optical amplifier device for use as a regenerative repeater, which is capable of keeping at a constant level the amplification factor for each of normal optical signals received from optical booster amplifiers or optical in-line amplifiers regardless of the number of optical signals even when one or more of the optical signals are interrupted for some reason, for thereby achieving a desired amplification factor.

Yet still another object of the present invention is to provide a wavelength-division-multiplexing optical transmission system which incorporates such optical amplifier devices.

According to the present invention, there is provided a wavelength-division-multiplexing optical amplifier device, comprising a plurality of optical transmitting means for transmitting a plurality of optical signals having different wavelengths, respectively, optical combining means for wavelength-division-multiplexing the optical signals into a wavelength-division-multiplexed optical signal, optical amplifying means for amplifying the wavelength-division-multiplexed optical signal, optical branching means connected respectively to the optical transmitting means, for branching the optical signals into branched optical signals, optical signal count detecting means for receiving the branched optical signals and detecting the number of actually transmitted optical signals thereby to generate a control signal, and control means responsive to the control signal, for controlling the optical amplifying means to equalize a level of the amplified wavelength-division-multiplexed optical signal to a level depending on the detected number of actually transmitted optical signals.

The optical amplifying means comprises an amplifying optical fiber, a light source for transmitting a pumping light to the amplifying optical fiber, and an optical combiner for combining the pumping light and the wavelength-division-multiplexed optical signal with each other, and the control means includes pumping light control means for controlling an output level of the pumping light based on the control signal.

The amplifying optical fiber comprises an erbium-added optical fiber. The optical amplifying means further comprises signal count superposing means for superposing information representative of the detected number of actually transmitted optical signals onto the amplified wavelength-division-multiplexed optical signal. The signal count superposing means comprises a sine-wave signal generator for generating a sine-wave signal representative of the detected number of actually transmitted optical signals, and means for controlling the pumping light source to output the pumping light in a sine-wave form based on the sine-wave signal.

The wavelength-division-multiplexing optical amplifier device is used, for example, as an optical transmission device having an optical booster function in a transmission terminal station of a wavelength-division-multiplexing optical transmission system.

According to the present invention, there is also provided a wavelength-division-multiplexing optical amplifier device, comprising signal count detecting means for detecting information representative of the number of optical signals from a wavelength-division-multiplexed optical signal composed of a plurality of optical signals having different wavelengths, respectively, optical amplifying means for amplifying the wavelength-division-multiplexed optical signal, control means for controlling the optical amplifying means to equalize a level of the amplified wavelength-division-multiplexed optical signal to a level depending on the detected number of optical signals, and signal count superposing means for superposing the information representative of the number of optical signals onto the amplified wavelength-division-multiplexed optical signal.

The wavelength-division-multiplexing optical amplifier device described above may be used as a linear optical repeater having an optical amplification function.

The wavelength-division-multiplexing optical transmission system includes the wavelength-division-multiplexing optical amplifier device as an optical transmission device and an optical repeater connected through an optical transmission path to the optical transmission device.

The above and other objects, features, and advantages of the present invention will become apparent from the following description with references to the accompanying drawings which illustrate examples of the present invention.

DETAILED DESCRIPTION OF THE PREFERRED EMBODIMENTS

According to the present invention, the output levels of optical signals from optical signal transmission terminal stations are branched respectively and detected by photodiodes, and the optical signals are counted by an optical signal count detector for setting an output level of an optical amplifier to a desired level. As information representing an optical signal count, i.e., the number of optical signals, detected by the optical signal count detector, a sine-wave signal having a frequency depending on the number of optical signals is superposed on a direct current for energizing a pumping laser diode of the optical amplifier, thereby adding an auxiliary signal to the envelope of a main optical signal for transmission. Therefore, the information representing the number of optical signals is transmitted to a downstream linear repeater or regenerative repeater.

The number of optical signals may be detected by establishing reception level ranges and determining which of the reception level ranges the sum of the levels of actually received optical signals falls in. Alternatively, there may be employed as many photodetectors as the number of optical signals having respective wavelengths, and the number of those photodetectors which are receiving optical signals may be detected as an optical signal count. Further alternatively, all optical signals having respective wavelengths may be detected by a single photodetector through a variable-wavelength filter placed in a stage preceding the photodetector for detecting the level of each of the optical signals.

In the linear repeater or regenerative repeater, the received optical signal is branched by an optical coupler, and the information representing the number of optical signals, which has been superposed on the envelope of the optical signal, is detected by an optical signal count detector from the branched optical signal. A DC voltage depending on the number of optical signals detected is applied as a reference voltage to a negative feedback circuit which controls the output power of the optical signal to achieve an optical signal output level depending on the number of optical signals detected.

A wavelength-division-multiplexing optical amplifier device according to a first embodiment of the present invention will be described below with reference to FIG. 1.

Figure 1:
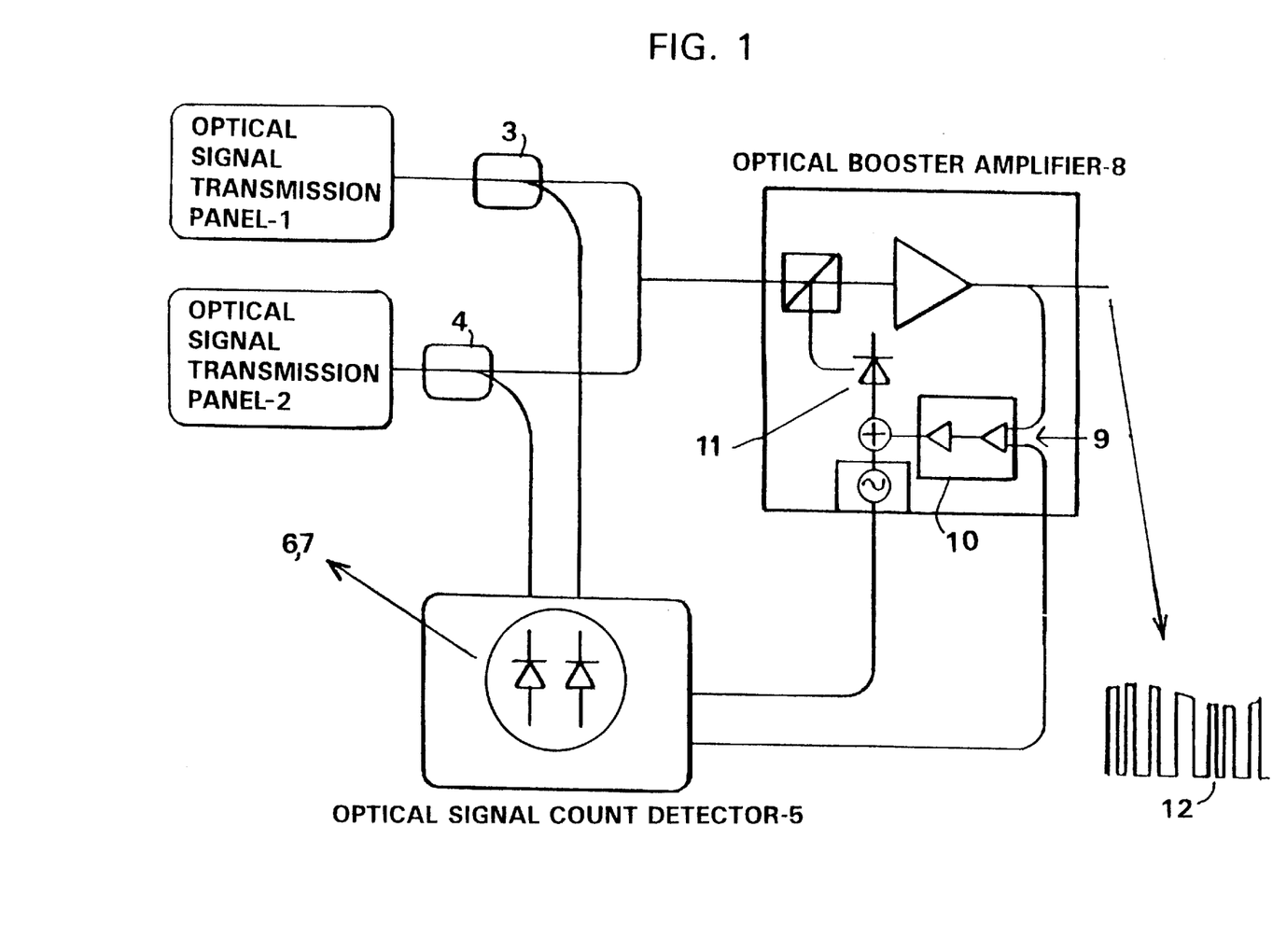
FIG. 1 is a block diagram of a wavelength-division-multiplexing optical amplifier device according to a first embodiment of the present invention.

As shown in FIG. 1, optical signal transmission terminal stations comprise a plurality of optical signal transmission panels 1, 2. In the illustrated embodiment, optical signals from two optical signal transmission panels 1, 2 are wavelength-division-multiplexed by way of example. The optical signals from the optical signal transmission panels 1, 2 are branched into main optical signals and control optical signals by respective optical couplers 3, 4. The control optical signals are converted to respective electric signals by respective photodiodes 6, 7 of an optical signal count detector 5. The electric signals from the optical signal count detector 5 are then applied as a reference voltage to a negative feedback circuit 9 of an optical booster amplifier 8 to control a direct current therein for producing an optimum optical signal output level depending on the number of optical signals.

The optical booster amplifier 8 has a sine-wave generator 10 which is energized at different freguencies. Depending on the number of optical signals for adding a sine-wave signal to a current that energizes a pumping laser diode (LD) 11. In this manner, an auxiliary signal is added to the envelope of the main optical signals 12 from the optical couplers 3, 4 to transmit the information representative of the number of optical signals together with the main optical signals.

The optical booster amplifier 8 may comprise an erbium-added optical fiber amplifier, for example.

Figure 2:
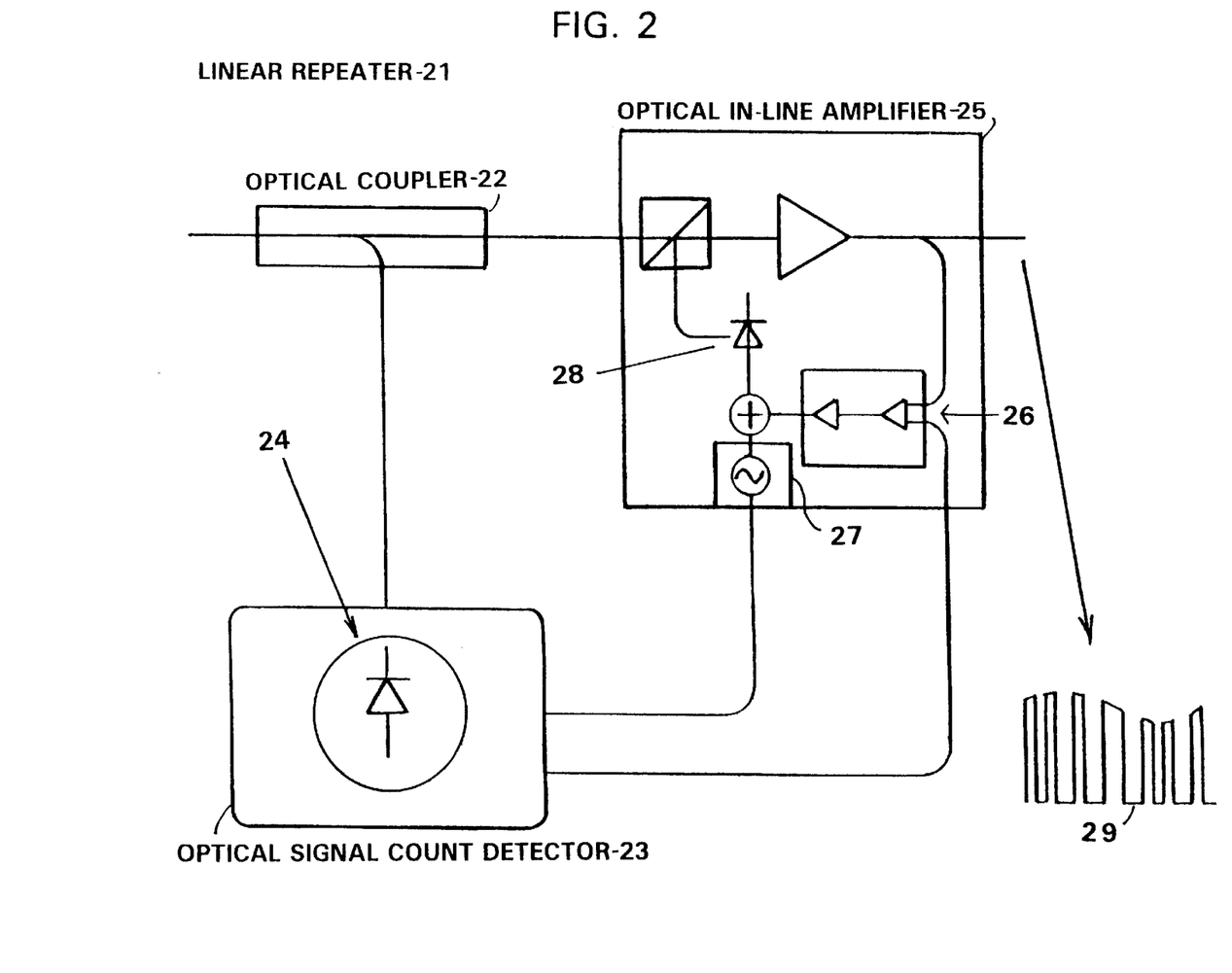
FIG. 2 is a block diagram of a wavelength-division-multiplexing optical amplifier device according to a second embodiment of the present invention.

FIG. 2 shows a wavelength-division-multiplexing optical amplifier device according to a second embodiment of the present invention. In FIG. 2, the wavelength-division-multiplexing optical amplifier comprises an optical in-line amplifier in a linear repeater, for example.

As shown in FIG. 2, an optical signal supplied to a linear repeater 21 is branched by an optical coupler 22 in an input stage. The branched optical signal is converted to an electric signal by a photodiode 24 of an optical signal count detector 23. The electric signal is then applied as a reference voltage to a negative feedback circuit 26 of an optical in-line amplifier 25 to control a direct current therein for producing an optimum optical signal output level depending on the number of optical signals.

The optical in-line amplifier 25 has a sine-wave generator 27 which is energized at different frequencies depending on the number of optical signals for adding a sine-wave signal to a current that energizes a pumping laser diode (LD) 28. In this manner, an auxiliary signal is added to the envelope of the main optical signal 29 from the optical coupler 22 to transmit the information representative of the number of optical signals together with the main optical signal.

The optical amplifier device according to the first embodiment is used as an optical amplifier device in an optical transmission station, and the optical amplifier device according to the second embodiment is used as an optical in-line amplifier, thereby constructing an optical transmission system capable of stably transmitting wavelength-division-multiplexed optical signals.

With the arrangement of the present invention, before a wavelength-division-multiplexed optical signal is amplified, the number of optical signals is detected, and the optical amplifier is controlled depending on the number of the optical signals detected. Therefore, the optical amplifier can produce an optical signal output level depending on the number of the optical signals detected. Since information representing the detected number of optical signals detected is added to the amplified wavelength-division-multiplexed optical signal for transmission. The transmitted wavelength-division-multiplexed optical signal can thus be amplified depending on the number of optical signals in an optical repeater downstream of the optical amplifier.

The optical amplifier device according to the present invention, which is capable of amplifying the wavelength-division-multiplexed optical signal depending on the number of optical signals detected, may be incorporated in an optical transmission system comprising an optical transmission device and an optical repeater amplifier device for stable wavelength-division-multiplexed optical signal transmission.

While preferred embodiments of the present invention have been described using specific terms, such description is for illustrative purposes only, and it is to be understood that changes and variations may be made without departing from the spirit or scope of the following claims.

What is claimed is:

1. A wavelength-division-multiplexing optical amplifier device, comprising:

a plurality of optical transmitting means for transmitting a plurality of optical signals having different wavelengths, respectively;

optical combining means for wavelength-division-multiplexing said optical signal into a wavelength-division-multiplexed optical signal;

optical amplifying means for amplifying said wavelength-division-multiplexed optical signal, said optical amplifying means including signal count superposing means for superposing information representative of the number of actually transmitted optical signals detected onto said amplified wavelength-division-multiplexed optical signal, said signal count superposing means comprising a sine-wave signal generator for generating a sine-wave signal representative of the number of actually transmitted optical signals detected;

optical branching means connected respectively to said optical transmitting means, for branching said optical signals into branched optical signals;

optical signal count detecting means for receiving said branched optical signals and detecting the number of actually transmitted optical signals thereby to generate a control signal; and control means responsive to said control signal, for controlling said optical amplifying means to equalize a level of said amplified wavelength-division-multiplexed optical signal to a level depending on the detected number of actually transmitted optical signals to superpose information representative of the number of actually transmitted optical signals detected onto said amplified wavelength-division-multiplexed optical signal.

2. A wavelength-division-multiplexing optical amplifier device according to claim 1, wherein said optical amplifying means comprises an amplifying optical fiber, a light source for transmitting a pumping light to said amplifying optical fiber, and an optical combiner for combining said pumping light and said wavelength-division-multiplexed optical signal with each other, and wherein said control means includes pumping light control means for controlling an output level of said pumping light based on said control signal.

3. A wavelength-division-multiplexing optical amplifier device according to claim 2, wherein said amplifying optical fiber comprises an erbium-added optical fiber.

4. A wavelength-division-multiplexing optical amplifier device according to claim 3, wherein said signal count superposing means comprises means for controlling said pumping light source to output said pumping light in a sine-wave form based on said sine-wave signal generated by said sine-wave signal generator.

5. A wavelength-division-multiplexing optical amplifier device, comprising:

signal count detecting means for detecting information representative of the number of optical signals from a wavelength-division-multiplexed optical signal composed of a plurality of optical signals having different wavelengths, respectively and from information representative of the number of optical signals superposed onto said wavelength-division-multiplexed optical signal;

optical amplifying means for amplifying said wavelength-division-multiplexed optical signal;

control means for controlling said optical amplifying means to equalize a level of said amplified wavelength-division-multiplexed optical signal to a level depending on the detected number of optical signals; and signal count superposing means for superposing said information representative of the number of optical signals onto said amplified wavelength-division-multiplexed optical signal, said signal count superposing means comprising a sine-wave signal generator for generating a sine-wave signal representative of the number of the detected optical signals actually transmitted.

6. A wavelength-division-multiplexing optical amplifier device according to claim 5, wherein said optical amplifying means comprises an amplifying optical fiber, a light source for transmitting a pumping light to said amplifying optical fiber, and an optical combiner for combining said pumping light and said wavelength-division-multiplexed optical signal with each other, and wherein said control means includes pumping light control means for controlling an output level of said pumping light based on said control signal.

7. A wavelength-division-multiplexing optical amplifier device according to claim 6, wherein said amplifying optical fiber comprises an erbium-added optical fiber.

8. A wavelength-division-multiplexing optical amplifier device according to claim 7, wherein said signal count superposing means comprises means for controlling said pumping light source to output said pumping light in a sine-wave form based on said sine-wave signal.

9. A wavelength-division-multiplexing optical transmission system comprising:

an optical transmission device comprising a wavelength-division-multiplexing optical amplifier device comprising:
  a plurality of optical transmitting means for transmitting a Plurality of optical signals having different wavelengths, respectively;
  optical combining means for wavelength-division-multiplexing said optical signal into a wavelength-division-multiplexed optical signal;
  optical amplifying means for amplifying said wavelength-division-multiplexed optical signal, said optical amplifying means including signal count superposing means for superposing information representative of the number of actually transmitted optical signals detected onto said amplified wavelength-division-multiplexed optical signal, said signal count superposing means comprising a sine-wave signal generator for generating a sine-wave signal representative of the number of actually transmitted optical signals detected;
  optical branching means connected respectively to said optical transmitting means, for branching said optical signals into branched optical signals;
  optical signal count detecting means for receiving said branched optical signals and detecting the number of actually transmitted optical signals thereby to generate a control signal; and
  control means responsive to said control signal, for controlling said optical amplifying means to equalize a level of said amplified wavelength-division-multiplexed optical signal to a level depending on the detected number of actually transmitted optical signals to superpose information representative of the number of actually transmitted optical signals detected onto said amplified wavelength-division-multiplexed optical signal; and
an optical repeater connected through an optical transmission path to said optical transmission device and comprising a wavelength-division-multiplexing optical amplifier device according to claim 5.

10. A wavelength-division-multiplexing optical transmission system comprising:
an optical transmission device comprising a wavelength-division-multiplexing optical amplifier device comprising:
  a plurality of optical transmitting means for transmitting a plurality of optical signals having different wavelengths, respectively;
  optical combining means for wavelength-division-multiplexing said optical signal into a wavelength-division-multiplexed optical signal;
  optical amplifying means for amplifying said wavelength-division-multiplexed optical signal, said optical amplifying means including signal count superposing means for superposing information representative of the number of actually transmitted optical signals detected onto said amplified wavelength-division-multiplexed optical signal, said signal count superposing means comprising a sine-wave signal generator for generating a sine-wave signal representative of the number of actually transmitted optical signals detected;
  optical branching means connected respectively to said optical transmitting means, for branching said optical signals into branched optical signals;
  optical signal count detecting means for receiving said branched optical signals and detecting the number of actually transmitted optical signals thereby to generate a control signal; and
  control means responsive to said control signal, for controlling said optical amplifying means to equalize a level of said amplified wavelength-division-multiplexed optical signal to a level depending on the detected number of actually transmitted optical signals to superpose information representative of the number of actually transmitted optical signals detected onto said amplified wavelength-division-multiplexed optical signal; and
an optical repeater connected through an optical transmission path to said optical transmission device and comprising a wavelength-division-multiplexing optical amplifier device according to claim 6.

11. A wavelength-division-multiplexing optical transmission system comprising:
an optical transmission device comprising a wavelength-division-multiplexing optical amplifier device comprising:
  a plurality of optical transmitting means for transmitting a plurality of optical signals having different wavelengths, respectively;
  optical combining means for wavelength-division-multiplexing said optical signal into a wavelength-division-multiplexed optical signal;
  optical amplifying means for amplifying said wavelength-division-multiplexed optical signal, said optical amplifying means including signal count superposing means for superposing information representative of the number of actually transmitted optical signals detected onto said amplified wavelength-division-multiplexed optical signal, said signal count superposing means comprising a sine-wave signal generator for generating a sine-wave signal representative of the number of actually transmitted optical signals detected;
  optical branching means connected respectively to said optical transmitting means, for branching said optical signals into branched optical signals;
  optical signal count detecting means for receiving said branched optical signals and detecting the number of actually transmitted optical signals thereby to generate a control signal; and
  control means responsive to said control signal, for controlling said optical amplifying means to equalize a level of said amplified wavelength-division-multiplexed optical signal to a level depending on the detected number of actually transmitted optical signals to superpose information representative of the number of actually transmitted optical signals detected onto said amplified wavelength-division-multiplexed optical signal; and
an optical repeater connected through an optical transmission path to said optical transmission device and comprising a wavelength-division-multiplexing optical amplifier device according to claim 8.

12. A wavelength-division-multiplexing optical transmission system comprising:
an optical transmission device comprising a wavelength-division-multiplexing optical amplifier device said optical amplifying means including signal count superposing means for superposing information representative of the number of actually transmitted optical signals detected onto said amplified wavelength-division-multiplexed optical signal; and
an optical repeater connected through an optical transmission path to said optical transmission device and comprising a wavelength-division-multiplexing optical amplifier device according to claim 8.

13. A wavelength-division-multiplexing optical transmission system comprising:

an optical transmission device comprising a wavelength-division-multiplexing optical amplifier device comprising:

a plurality of optical transmitting means for transmitting a plurality of optical signals having different wavelengths, respectively;

optical combining means for wavelength-division-multiplexing said optical signal into a wavelength-division-multiplexed optical signal;

optical amplifying means for amplifying said wavelength-division-multiplexed optical signal, said optical amplifying means including signal count superposing means for superposing information representative of the number of actually transmitted optical signals detected onto said amplified wavelength-division-multiplexed optical signal, said signal count superposing means comprising a sine-wave signal generator for generating a sine-wave signal representative of the number of actually transmitted optical signals detected;

optical branching means connected respectively to said optical transmitting means, for branching said optical signals into branched optical signals;

optical signal count detecting means for receiving said branched optical signals and detecting the number of actually transmitted optical signals thereby to generate a control signal; and control means responsive to said control signal, for controlling said optical amplifying means to equalize a level of said amplified wavelength-division-multiplexed optical signal to a level depending on the detected number of actually transmitted optical signals to superpose information representative of the number of actually transmitted optical signals detected onto said amplified wavelength-division-multiplexed optical signal, wherein said optical amplifier means comprises an amplifying optical fiber, a light source for transmitting a pumping light to said amplifying optical fiber, and an optical combiner for combining said pumping light and said wavelength-division-multiplexed optical signal with each other, and wherein said control means includes pumping light control means for controlling an output level of said pumping light based on said control signal; and an optical repeater connected through an optical transmission path to said optical transmission device and comprising a wavelength-division-multiplexing optical amplifier device according to claim 5.

14. A wavelength-division-multiplexing optical transmission system comprising:

an optical transmission device comprising a wavelength-division-multiplexing optical amplifier device comprising:

a plurality of optical transmitting means for transmitting a plurality of optical signals having different wavelengths, respectively;

optical combining means for wavelength-division-multiplexing said optical signal into a wavelength-division-multiplexed optical signal;

optical amplifying means for amplifying said wavelength-division-multiplexed optical signal, said optical amplifying means including signal count superposing means for superposing information representative of the number of actually transmitted optical signals detected onto said amplified wavelength-division-multiplexed optical signal, said signal count superposing means comprising a sine-wave signal generator for generating a sine-wave signal representative of the number of actually transmitted optical signals detected;

optical branching means connected respectively to said optical transmitting means, for branching said optical signals into branched optical signals;

optical signal count detecting means for receiving said branched optical signals and detecting the number of actually transmitted optical signals thereby to generate a control signal; and control means responsive to said control signal, for controlling said optical amplifying means to equalize a level of said amplified wavelength-division-multiplexed optical signal to a level depending on the detected number of actually transmitted optical signals to superpose information representative of the number of actually transmitted optical signals detected onto said amplified wavelength-division-multiplexed optical signal, wherein said optical amplifier means comprises an amplifying optical fiber, a light source for transmitting a pumping light to said amplifying optical fiber, and an optical combiner for combining said pumping light and said wavelength-division-multiplexed optical signal with each other, and wherein said control means includes pumping light control means for controlling an output level of said pumping light based on said control signal; and an optical repeater connected through an optical transmission path to said optical transmission device and comprising a wavelength-division-multiplexing optical amplifier device according to claim 6.

15. A wavelength-division-multiplexing optical transmission system comprising:

an optical transmission device comprising a wavelength-division-multiplexing optical amplifier device comprising:

a plurality of optical transmitting means for transmitting a plurality of optical signals having different wavelengths, respectively;

optical combining means for wavelength-division-multiplexing said optical signal into a wavelength-division-multiplexed optical signal;

optical amplifying means for amplifying said wavelength-division-multiplexed optical signal, said optical amplifying means including signal count superposing means for superposing information representative of the number of actually transmitted optical signals detected onto said amplified wavelength-division-multiplexed optical signal, said signal count superposing means comprising a sine-wave signal generator for generating a sine-wave signal representative of the number of actually transmitted optical signals detected;

optical branching means connected respectively to said optical transmitting means, for branching said optical signals into branched optical signals;

optical signal count detecting means for receiving said branched optical signals and detecting the number of actually transmitted optical signals thereby to generate a control signal; and control means responsive to said control signal, for controlling said optical amplifying means to equalize a level of said amplified wavelength-division-multiplexed optical signal to a level depending on the detected number of actually transmitted optical signals to superpose information representative of the number of actually transmitted optical signals detected onto said amplified wavelength-division-multiplexed optical signal, wherein said optical amplifier means comprises an amplifying optical fiber, a light source for transmitting a pumping light to said amplifying optical fiber, and an optical combiner for combining said pumping light and said wavelength-division-multiplexed optical signal with each other, and wherein said control means includes pumping light control means for controlling an output level of said pumping light based on said control signal; and an optical repeater connected through an optical transmission path to said optical transmission device and comprising a wavelength-division-multiplexing optical amplifier device according to claim 7.

16. A wavelength-division-multiplexing optical transmission system comprising:

an optical transmission device comprising a wavelength-division-multiplexing optical amplifier device comprising:

a plurality of optical transmitting means for transmitting a plurality of optical signals having different wavelengths, respectively;

optical combining means for wavelength-division-multiplexing said optical signal into a wavelength-division-multiplexed optical signal;

optical amplifying means for amplifying said wavelength-division-multiplexed optical signal, said optical amplifying means including signal count superposing means for superposing information representative of the number of actually transmitted optical signals detected onto said amplified wavelength-division-multiplexed optical signal, said signal count superposing means comprising a sine-wave signal generator for generating a sine-wave signal representative of the number of actually transmitted optical signals detected;

optical branching means connected respectively to said optical transmitting means, for branching said optical signals into branched optical signals;

optical signal count detecting means for receiving said branched optical signals and detecting the number of actually transmitted optical signals thereby to generate a control signal; and control means responsive to said control signal, for controlling said optical amplifying means to equalize a level of said amplified wavelength-division-multiplexed optical signal to a level depending on the detected number of actually transmitted optical signals to superpose information representative of the number of actually transmitted optical signals detected onto said amplified wavelength-division-multiplexed optical signal, wherein said optical amplifier means comprises an amplifying optical fiber, a light source for transmitting a pumping light to said amplifying optical fiber, and an optical combiner for combining said pumping light and said wavelength-division-multiplexed optical signal with each other, and wherein said control means includes pumping light control means for controlling an output level of said pumping light based on said control signal; and an optical repeater connected through an optical transmission path to said optical transmission device and comprising a wavelength-division-multiplexing optical amplifier device according to claim 8.

17. A wavelength-division-multiplexing optical transmission system comprising:

an optical transmission device comprising a wavelength-division-multiplexing optical amplifier device comprising:

a plurality of optical transmitting means for transmitting a plurality of optical signals having different wavelengths, respectively;

optical combining means for wavelength-division-multiplexing said optical signal into a wavelength-division-multiplexed optical signal;

optical amplifying means for amplifying said wavelength-division-multiplexed optical signal, said optical amplifying means including signal count superposing means for superposing information representative of the number of actually transmitted optical signals detected onto said amplified wavelength-division-multiplexed optical signal, said signal count superposing means comprising a sine-wave signal generator for generating a sine-wave signal representative of the number of actually transmitted optical signals detected;

optical branching means connected respectively to said optical transmitting means, for branching said optical signals into branched optical signals;

optical signal count detecting means for receiving said branched optical signals and detecting the number of actually transmitted optical signals thereby to generate a control signal; and control means responsive to said control signal, for controlling said optical amplifying means to equalize a level of said amplified wavelength-division-multiplexed optical signal to a level depending on the detected number of actually transmitted optical signals to superpose information representative of the number of actually transmitted optical signals detected onto said amplified wavelength-division-multiplexed optical signal, wherein said optical amplifier means comprises an amplifying optical fiber, a light source for transmitting a pumping light to said amplifying optical fiber, and an optical combiner for combining said pumping light and said wavelength-division-multiplexed optical signal with each other, and wherein said control means includes pumping light control means for controlling an output level of said pumping light based on said control signal, and said amplifying optical fiber comprises an erbium-added optical fiber; and an optical repeater connected through an optical transmission path to said optical transmission device and comprising a wavelength-division-multiplexing optical amplifier device according to claim 5.

18. A wavelength-division-multiplexing optical transmission system comprising:

an optical transmission device comprising a wavelength-division-multiplexing optical amplifier device comprising:

a plurality of optical transmitting means for transmitting a plurality of optical signals having different wavelengths, respectively;

optical combining means for wavelength-division-multiplexing said optical signal into a wavelength-division-multiplexed optical signal;

optical amplifying means for amplifying said wavelength-division-multiplexed optical signal, said optical amplifying means including signal count superposing means for superposing information representative of the number of actually transmitted optical signals detected onto said amplified wavelength-division-multiplexed optical signal, said signal count superposing means comprising a sine-wave signal generator for generating a sine-wave signal representative of the number of actually transmitted optical signals detected;

optical branching means connected respectively to said optical transmitting means, for branching said optical signals into branched optical signals;

optical signal count detecting means for receiving said branched optical signals and detecting the number of actually transmitted optical signals thereby to generate a control signal; and control means responsive to said control signal, for controlling said optical amplifying means to equalize a level of said amplified wavelength-division-multiplexed optical signal to a level depending on the detected number of actually transmitted optical signals to superpose information representative of the number of actually transmitted optical signals detected onto said amplified wavelength-division-multiplexed optical signal, wherein said optical amplifier means comprises an amplifying optical fiber, a light source for transmitting a pumping light to said amplifying optical fiber, and an optical combiner for combining said pumping light and said wavelength-division-multiplexed optical signal with each other, and wherein said control means includes pumping light control means for controlling an output level of said pumping light based on said control signal, and said amplifying optical fiber comprises an erbium-added optical fiber; and an optical repeater connected through an optical transmission path to said optical transmission device and comprising a wavelength-division-multiplexing optical amplifier device according to claim 6.

19. A wavelength-division-multiplexing optical transmission system comprising:

an optical transmission device comprising a wavelength-division-multiplexing optical amplifier device comprising:

a plurality of optical transmitting means for transmitting a plurality of optical signals having different wavelengths, respectively;

optical combining means for wavelength-division-multiplexing said optical signal into a wavelength-division-multiplexed optical signal;

optical amplifying means for amplifying said wavelength-division-multiplexed optical signal, said optical amplifying means including signal count superposing means for superposing information representative of the number of actually transmitted optical signals detected onto said amplified wavelength-division-multiplexed optical signal, said signal count superposing means comprising a sine-wave signal generator for generating a sine-wave signal representative of the number of actually transmitted optical signals detected;

optical branching means connected respectively to said optical transmitting means, for branching said optical signals into branched optical signals;

optical signal count detecting means for receiving said branched optical signals and detecting the number of actually transmitted optical signals thereby to generate a control signal; and control means responsive to said control signal, for controlling said optical amplifying means to equalize a level of said amplified wavelength-division-multiplexed optical signal to a level depending on the detected number of actually transmitted optical signals to superpose information representative of the number of actually transmitted optical signals detected onto said amplified wavelength-division-multiplexed optical signal, wherein said optical amplifier means comprises an amplifying optical fiber, a light source for transmitting a pumping light to said amplifying optical fiber, and an optical combiner for combining said pumping light and said wavelength-division-multiplexed optical signal with each other, and wherein said control means includes pumping light control means for controlling an output level of said pumping light based on said control signal, and said amplifying optical fiber comprises an erbium-added optical fiber; and an optical repeater connected through an optical transmission path to said optical transmission device and comprising a wavelength-division-multiplexing optical amplifier device according to claim 7.

20. A wavelength-division-multiplexing optical transmission system comprising:

an optical transmission device comprising a wavelength-division-multiplexing optical amplifier device comprising:

a plurality of optical transmitting means for transmitting a plurality of optical signals having different wavelengths, respectively;

optical combining means for wavelength-division-multiplexing said optical signal into a wavelength-division-multiplexed optical signal;

optical amplifying means for amplifying said wavelength-division-multiplexed optical signal, said optical amplifying means including signal count superposing means for superposing information representative of the number of actually transmitted optical signals detected onto said amplified wavelength-division-multiplexed optical signal, said signal count superposing means comprising a sine-wave signal generator for generating a sine-wave signal representative of the number of actually transmitted optical signals detected;

optical branching means connected respectively to said optical transmitting means, for branching said optical signals into branched optical signals;

optical signal count detecting means for receiving said branched optical signals and detecting the number of actually transmitted optical signals thereby to generate a control signal; and control means responsive to said control signal, for controlling said optical amplifying means to equalize a level of said amplified wavelength-division-multiplexed optical signal to a level depending on the detected number of actually transmitted optical signals to superpose information representative of the number of actually transmitted optical signals detected onto said amplified wavelength-division-multiplexed optical signal, wherein said optical amplifier means comprises an amplifying optical fiber, a light source for transmitting a pumping light to said amplifying optical fiber, and an optical combiner for combining said pumping light and said wavelength-division-multiplexed optical signal with each other, and wherein said control means includes pumping light control means for controlling an output level of said pumping light based on said control signal, and said amplifying optical fiber comprises an erbium-added optical fiber; and an optical repeater connected through an optical transmission path to said optical transmission device and comprising a wavelength-division-multiplexing optical amplifier device according to claim 8.

21. A wavelength-division-multiplexing optical transmission system comprising:

an optical transmission device comprising a wavelength-division-multiplexing optical amplifier device comprising:

a plurality of optical transmitting means for transmitting a plurality of optical signals having different wavelengths, respectively;

optical combining means for wavelength-division-multiplexing said optical signal into a wavelength-division-multiplexed optical signal;

optical amplifying means for amplifying said wavelength-division-multiplexed optical signal, said optical amplifying means including signal count superposing means for superposing information representative of the number of actually transmitted optical signals detected onto said amplified wavelength-division-multiplexed optical signal, said signal count superposing means comprising a sine-wave signal generator for generating a sine-wave signal representative of the number of actually transmitted optical signals detected;

optical branching means connected respectively to said optical transmitting means, for branching said optical signals into branched optical signals;

optical signal count detecting means for receiving said branched optical signals and detecting the number of actually transmitted optical signals thereby to generate a control signal; and control means responsive to said control signal, for controlling said optical amplifying means to equalize a level of said amplified wavelength-division-multiplexed optical signal to a level depending on the detected number of actually transmitted optical signals to superpose information representative of the number of actually transmitted optical signals detected onto said amplified wavelength-division-multiplexed optical signal, wherein said optical amplifier means comprises an amplifying optical fiber, a light source for transmitting a pumping light to said amplifying optical fiber, and an optical combiner for combining said pumping light and said wavelength-division-multiplexed optical signal with each other, and wherein said control means includes pumping light control means for controlling an output level of said pumping light based on said control signal, wherein said amplifying optical fiber comprises an erbium-added optical fiber, and said signal count superposing means comprises means for controlling said pumping light source to output said pumping light in a sine-wave form based on said sine-wave signal generated by said sine-wave signal generator; and an optical repeater connected through an optical transmission path to said optical transmission device and comprising a wavelength-division-multiplexing optical amplifier device according to claim 5.

22. A wavelength-division-multiplexing optical transmission system comprising:

an optical transmission device comprising a wavelength-division-multiplexing optical amplifier device comprising:

a plurality of optical transmitting means for transmitting a plurality of optical signals having different wavelengths, respectively;

optical combining means for wavelength-division-multiplexing said optical signal into a wavelength-division-multiplexed optical signal;

optical amplifying means for amplifying said wavelength-division-multiplexed optical signal, said optical amplifying means including signal count superposing means for superposing information representative of the number of actually transmitted optical signals detected onto said amplified wavelength-division-multiplexed optical signal, said signal count superposing means comprising a sine-wave signal generator for generating a sine-wave signal representative of the number of actually transmitted optical signals detected;

optical branching means connected respectively to said optical transmitting means, for branching said optical signals into branched optical signals;

optical signal count detecting means for receiving said branched optical signals and detecting the number of actually transmitted optical signals thereby to generate a control signal; and control means responsive to said control signal, for controlling said optical amplifying means to equalize a level of said amplified wavelength-division-multiplexed optical signal to a level depending on the detected number of actually transmitted optical signals to superpose information representative of the number of actually transmitted optical signals detected onto said amplified wavelength-division-multiplexed optical signal, wherein said optical amplifier means comprises an amplifying optical fiber, a light source for transmitting a pumping light to said amplifying optical fiber, and an optical combiner for combining said pumping light and said wavelength-division-multiplexed optical signal with each other, and wherein said control means includes pumping light control means for controlling an output level of said pumping light based on said control signal, said amplifying optical fiber comprises an erbium-added optical fiber, and said signal count superposing means comprises means for controlling said pumping light source to output said pumping light in a sine-wave form based on said sine-wave signal generated by said sine-wave signal generator; and an optical repeater connected through an optical transmission path to said optical transmission device and comprising a wavelength-division-multiplexing optical amplifier device according to claim 6.

23. A wavelength-division-multiplexing optical transmission system comprising:

an optical transmission device comprising a wavelength-division-multiplexing optical amplifier device comprising:

a plurality of optical transmitting means for transmitting a plurality of optical signals having different wavelengths, respectively;

optical combining means for wavelength-division-multiplexing said optical signal into a wavelength-division-multiplexed optical signal;

optical amplifying means for amplifying said wavelength-division-multiplexed optical signal, said optical amplifying means including signal count superposing means for superposing information representative of the number of actually transmitted optical signals detected onto said amplified wavelength-division-multiplexed optical signal, said signal count superposing means comprising a sine-wave signal generator for generating a sine-wave signal representative of the number of actually transmitted optical signals detected;

optical branching means connected respectively to said optical transmitting means, for branching said optical signals into branched optical signals;

optical signal count detecting means for receiving said branched optical signals and detecting the number of actually transmitted optical signals thereby to generate a control signal; and control means responsive to said control signal, for controlling said optical amplifying means to equalize a level of said amplified wavelength-division-multiplexed optical signal to a level depending on the detected number of actually transmitted optical signals to superpose information representative of the number of actually transmitted optical signals detected onto said amplified wavelength-division-multiplexed optical signal wherein said optical amplifier means comprises an amplifying optical fiber, a light source for transmitting a pumping light to said amplifying optical fiber, and an optical combiner for combining said pumping light and said wavelength-division-multiplexed optical signal with each other, and wherein said control means includes pumping light control means for controlling an output level of said pumping light based on said control signal, said amplifying optical fiber comprises an erbium-added optical fiber, and said signal count superposing means comprises means for controlling said pumping light source to output said pumping light in a sine-wave form based on said sine-wave signal generated by said sine-wave signal generator; and an optical repeater connected through an optical transmission path to said optical transmission device and comprising a wavelength-division-multiplexing optical amplifier device according to claim 7.

24. A wavelength-division-multiplexing optical transmission system comprising:

an optical transmission device comprising a wavelength-division-multiplexing optical amplifier device comprising:

a plurality of optical transmitting means for transmitting a plurality of optical signals having different wavelengths, respectively;

optical combining means for wavelength-division-multiplexing said optical signal into a wavelength-division-multiplexed optical signal;

optical amplifying means for amplifying said wavelength-division-multiplexed optical signal, said optical amplifying means including signal count superposing means for superposing information representative of the number of actually transmitted optical signals detected onto said amplified wavelength-division-multiplexed optical signal, said signal count superposing means comprising a sine-wave signal generator for generating a sine-wave signal representative of the number of actually transmitted optical signals detected;

optical branching means connected respectively to said optical transmitting means, for branching said optical signals into branched optical signals;

optical signal count detecting means for receiving said branched optical signals and detecting the number of actually transmitted optical signals thereby to generate a control signal; and control means responsive to said control signal, for controlling said optical amplifying means to equalize a level of said amplified wavelength-division-multiplexed optical signal to a level depending on the detected number of actually transmitted optical signals to superpose information representative of the number of actually transmitted optical signals detected onto said amplified wavelength-division-multiplexed optical signal, wherein said optical amplifier means comprises an amplifying optical fiber, a light source for transmitting a pumping light to said amplifying optical fiber, and an optical combiner for combining said pumping light and said wavelength-division-multiplexed optical signal with each other, and wherein said control means includes pumping light control means for controlling an output level of said pumping light based on said control signal, said amplifying optical fiber comprises an erbium-added optical fiber, and said signal count superposing means comprises means for controlling said pumping light source to output said pumping light in a sine-wave form based on said sine-wave signal generated by said sine-wave signal generator; and an optical repeater connected through an optical transmission path to said optical transmission device and comprising a wavelength-division-multiplexing optical amplifier device according to claim 8.

* * * * *